United States Patent [19]

Bouet

[11] Patent Number: 4,704,208

[45] Date of Patent: Nov. 3, 1987

[54] SCALE-INHIBITING PROCESS

[75] Inventor: Philippe A. Bouet, Cudot, France

[73] Assignee: Faborga, S.A., Geneva, Switzerland

[21] Appl. No.: 803,568

[22] Filed: Dec. 2, 1985

[30] Foreign Application Priority Data

Dec. 4, 1984 [FR] France ................ 84 18429

[51] Int. Cl.$^4$ ............................................. C02F 5/12
[52] U.S. Cl. ................................... 210/698; 210/701; 252/180
[58] Field of Search .............. 210/698–701; 252/180, 181

[56] References Cited

U.S. PATENT DOCUMENTS

| | | | |
|---|---|---|---|
| 3,591,513 | 7/1971 | Tate ................................. | 252/180 |
| 4,062,796 | 12/1977 | Gardner et al. ................ | 210/698 |
| 4,085,060 | 4/1978 | Vassileff ......................... | 252/180 |

FOREIGN PATENT DOCUMENTS

| | | |
|---|---|---|
| 1435023 | 3/1966 | France . |
| 2116139 | 7/1972 | France . |
| 2223308 | 6/1977 | France . |
| 2514746 | 5/1985 | France . |
| 2544722 | 7/1985 | France . |
| 1577923 | 10/1980 | United Kingdom . |

OTHER PUBLICATIONS

"TUV Guidelines for Testing Scale-Inhibiting Agents", Sep. 1973.

Primary Examiner—Peter Hruskoci

[57] ABSTRACT

The scale-inhibiting agent used is a combination with a synergistic effect of at least 50% by weight of salified polymers of ethylenic acids, chosen from polymaleates, polyacrylates, polymethacrylates, maleateacrylate copolymers, acrylate-methacrylate copolymers, acrylate-methacrylate-itaconate terpolymers, and mixtures of these substances, and at most 50 wt. % aliphatic polyamines with the formula

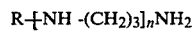

$$R \text{-}[NH\text{-}(CH_2)_3]_n NH_2$$

wherein R represents an aliphatic radical having 12 to 18 carbon atoms and n can be an odd or even whole number between 1 and 6, the percentages being based on polymers and polyamines in the dry state. These percentages are preferably 5 to 15 wt. % aliphatic polyamines per 95 to 85 wt. % polymers.

7 Claims, No Drawings

SCALE-INHIBITING PROCESS

The invention relates to a process which allows the anti-fouling activity of scale-inhibiting polymers in industrial plants employing water containing precipitable salts to be considerably enhanced.

The invention also relates to combinations of products used for this purpose in said plants.

Except for rare exceptions, where they have low salinity but are generally corrosive, most natural waters contain certain alkaline-earth metal salts, particularly calcium and/or magnesium, in solution, which have the troublesome property of becoming gradually insoluble under the combined or separate effects of a rise in temperature and/or their progressive concentration due to evaporation of the water itself. This gradual insolubilization causes not only precipitation which is very troublesome in itself, but also attachment of these precipitates to the metal surfaces and, in particular, in heat production or transfer facilities, to surfaces which are specifically designed to transfer calories.

Whether the goal is to convert such water into steam for thermal or thermodynamic use or to use it to transfer or evacuate calories, the precipitates observed decrease heat exchanges and hence heat yields considerably, and can even cause decreases in passage cross sections and flowrates of waters used in the facilities.

It is certain that the high yields demanded today, both for economic reasons and because of the decreasing availability of water, have led industry to pretreat such water to the maximum extent to remove all salts therefrom by demineralization or to render these salts nonprecipitable by ion exchange or to provide them with additives able to retard, or in some cases even prevent, their progressive insolubilization. In particular, when the number of calories to be evacuated in cooling facilities is large, the makeup water requirement is generally proportionately large and complete pretreatments require such large auxiliary facilities that they become in themselves actual factories which are very expensive. In such cases, certain additives opportunely permit less complete and hence less expensive pretreatments to be tolerated by retarding precipitation and decreasing surface adhesion of scale-forming salts, some or all of which can thus remain in the water.

Likewise, although the high yields and high flowrates achieved in heat generators with very high thermal powers require extreme purification treatments of makeup water in which no gases or salts are tolerable, this is not always the case in medium- and low-power boilers which, despite the excellent yields they permit, can tolerate residual salinities, deliberate or accidental, provided certain precautions are taken and specific scale-inhibiting additives are used.

Among the additives that have been proposed in the specialized literature and scale-inhibiting compositions and even precipitation-inhibiting compositions which employ very different substances such as aliphatic polyamines derived from fats, claimed in French Pat. No. 1,435,023, polymer derivatives of hydrolyzed maleic anhydride, and synergistic mixtures of polymaleic anhydride derivatives and polyacrylic and polymethacrylic acids as well as their salts claimed in French Pat. Nos. 2,116,139 and 2,223,308, acrylic acid polymers widely available commercially in their water-soluble sodium salt or acid forms, polymers and/or copolymers of acrylic and methacrylic acids with predetermined molecular weights and their salts claimed in French Pat. No. 2,514,746, or terpolymers of acrylic, methacrylic, and itaconic acids and their salts claimed in French Pat. No. 2,544,722 as well as substantial improvements in the specific activities of scale-inhibiting additives.

Concerned by the limitations in scale-inhibiting effectiveness still inherent in certain inhibiting compositions already mentioned, particularly those encountered in the use of fatty polyamines claimed for this purpose in French Pat. No. 1,435,023 already cited, applicant has studied the possibilities of combining them with the more effective derivatives claimed in the other above-mentioned patents.

One of the major difficulties encountered in this study was the development of an adequate operating process allowing scaling phenomena to be speeded up and reproduced as easily as possible, as well as precise and comparative laboratory measurements under sufficiently reliable conditions.

Indeed, although French Pat. No. 1,435,023 lists experiments in the generators themselves, it must be recognized that this practice in situ is very time-consuming and costly as well as relatively imprecise due to the large and variable quantities of precipitates involved, as a function of the operating modes of the generators, which themselves are variable. This method also entails the risk of allowing excessive scaling in the facilities. Likewise, French Pat. Nos. 2,116,139 and 2,223,308 already cited list experiments that can last 1000 hours, 500 hours, or at best 5 days. In addition to the fact that these methods are relatively lengthy by comparison to the study project envisaged by applicant, some of them seem involuntarily to neglect certain factors that determine scaling phenomena such as, during their progressive concentration, the distribution of precipitable salts into less dangerous precipitates in the form of sludges and into very harmful precipitates in the form of fouling scale, formation of which indeed dangerously compromises the operation and lifetimes of the facilities. Based on a method developed by the German testing organization called VdTÜV, applicant used for its study a simplified operating process described hereinbelow and having many advantages such as the relative speed of the tests which can be run, including analyses, in about 15 hours, their perfect reproducibility, and the reliability of the measurements so that unquestionable comparisons of effectiveness can be made.

So, as the tests according to the process described below proceeded, applicant was surprised to discover that the combination of fatty polyamines, already mentioned, with the other polymer substances also mentioned above showed, in all the cases studied, an activation effect which could be related to what is called the "synergistic" effect.

In fact, applicant has quite surprisingly found that the pure and simple addition of small proportions of fatty polyamines to polymaleates and/or polyacrylates and/or acrylate-methacrylate copolymers and/or acrylate-methacrylate-itaconate terpolymers, alone or in mixtures of said substances, improves the effectiveness of the components in distinctly larger proportions than those theoretically and logically expected in view of the effectiveness measured, under the same conditions, for each component taken alone, in the respective quantities considered.

Conversely, addition of small proportions of the polymers cited to large proportions of fatty polyamines does not lead to a fairly unexpected phenomenon of this type. Indeed, in all the latter cases studied, any improvement obtained was only the arithmetic sum of the activities specific to each component tested alone, in the quantities considered.

In addition, the surprising activation phenomenon described above does not seem to increase in direct proportion to the quantities of fatty polyamines added to the polymers already cited. Tests have shown that the minimum proportions of 5 to 15 wt.% expressed in active products of fatty polyamines per 95 to 85 wt.% expressed in active products of scale-inhibiting polymers, in the compositions tested, suffice to bring about the observed effect.

On the other hand, the addition of higher proportions of fatty polyamines to the scale-inhibiting polymers tested does not decrease the surprising phenomenon described at all. Thus, in the testing process described hereinbelow, mixtures composed of 50 wt.% scale-inhibiting polymers and 50 wt.% fatty polyamines gave results comparable, from the standpoint of scale formation to those obtained with mixtures containing 15% fatty polyamines to 85% polymers.

The present invention, which arises from these findings, has as its first object a scale-inhibiting process characterized by the use, as an scale-inhibiting agent to be added to the water to be treated, as combination with a synergistic effect of at least 50 wt.% polymers salified with ethylenic acids, chosen from polymaleates, polyacrylates, polymethacrylates, maleate-acrylate copolymers, acrylate-methacrylate copolymers, acrylate-methacrylate-itaconate terpolymers, and mixtures of these substances, and at most 50 wt.% aliphatic polyamines with the formula

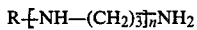

wherein R represents an aliphatic radical having 12 to 18 carbon atoms and n can be an odd or even whole number between 1 to 6, with the percentages relating to polymers and polyamines in the dry state. Said combination preferably contains 95 to 85 wt.% of said polymers and 5 to 15 wt.% of said aliphatic polyamines.

Another object of the invention is a scale-inhibiting agent for implementation of the process, characterized by being said combination as defined above which preferably contains 95 to 85 wt.% of said polymers and 5 to 15 wt.% of said aliphatic polyamines.

The fatty polyamines tested by applicant are of the type of those described in French Pat. No. 1,435,023 and having the following general formula

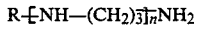

wherein R represents an aliphatic radical having 12 to 18 carbon atoms and n can be an odd or even whole number between 1 to 6.

The industrial polyamines with the above general formula can be derived from the conversion, known in industry, of fatty alcohols or acids of plant, animal, or synthetic origin and may or may not have, in the aliphatic radical with $C_{12}$-$C_{18}$, simple or conjugated double bonds such as may be contained in the industrial fatty polyamines on the market.

They can also be in the form of liquids, pastes, or even solids at room temperature and their dissolution or dispersion in water can be accomplished by simple means well known to those skilled in the art, for example mechanical agitation at selected temperatures and/or by the intermediary of small proportions of non-ionic surfactants or solvents known of themselves not to possess appreciable scale-inhibiting properties.

The hydrolyzed-maleic anhydride polymers subjected to the tests of the type described in the aforementioned French Pat. Nos. 2,116,139 and 2,223,308 seem to have a structure with the general formula (I) below:

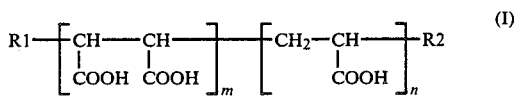

wherein R1 and R2, which are different or identical, are hydrogen or radicals deriving from the polymerization solvent or catalyst used, m is some number other than zero, and the sum m+n must be at least equal to 2 and less than about 50 and such that the polymer has the desired molecular weight of between 300 and 5000. Since polymers of this type still have a still rather poorly defined structure, as stated in French Pat. No. 2,116,139, the applicant tested those which claim a mean molecular weight (mmw) of about 800 (recommended in said patent) as has been commercially available to applicant.

They are designated in the present application by the general term "polymaleates mmw 800" in the form of water-soluble, sodium, or other salts.

The acrylic acid polymers are of the type having general formula (II) below:

wherein the index p has a value such that the mean molecular weight of said polymers is approximately 1500. They are readily available on the market in the acid form.

In the present application they are designated by the general term "polyacrylates mmw 1500" in the form of water-soluble, sodium, or other salts.

The polymers and/or copolymers of acrylic and methacrylic acid tested are of the type claimed in French Pat. No. 2,514,746 already cited and have the general formula (III) below:

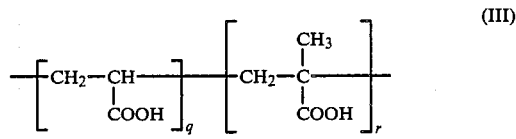

wherein, in the case of methacrylic acid polymers, q is equal to zero and r has a value such that the mean molecular weight of the polymers is about 800 and, in the case of acrylic and methacrylic acid copolymers, q and r have values such that the sum q+r confers on said copolymers a mean molecular weight of about 800, 100% of the molecular weights always being less than 1200 and at least 90% of them being between 400 and 1000. These components are readily available on the market in the form of water-soluble, sodium, or other salts. They are designated in the present application by the general term "polyacrylates mmw 800."

The terpolymers of acrylic, methacrylic, and itaconic acids tested are of the type claimed in French Pat. No.

2,544,722 already cited and have the general formula (IV) below:

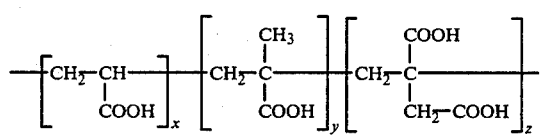

(IV)

wherein the indexes x, y, and z, expressed in wt.%, have at least a value of 10 x and y and a value of 5 for z and are such that the sums $x+y+z$ confer on said terpolymers molecular weights distributed between 700 and 1500 and a mean molecular weight of about 1000. They are readily available on the market in the acid form.

They are used in the present application in the form of water-soluble, sodium, or other salts, which are designated by the general term "polyacrylates mmw 1000."

The salified polymers presently considered are generally water-soluble. Sodium salts, which are less expensive, are preferably used.

The general formula of the fatty polyamines and formulas I to IV above clearly show the very great diversity of scale-inhibiting polyamines and polymers tested. However, in view of the strictness of the tests to which these substances and their combinations were subjected by Applicant, and as much to make clear the activation effect observed as to show its unexpected, systematic, and progressive nature, the deliberate choice has been made to cite, in Table I below, only the results obtained with the most widely commercially available additives which, as far as the polyacrylates are concerned, are chosen from among those most effective under the testing conditions.

However, this great diversity of substances tested implies that the deliberate limitation of examples in Table I constitutes no limitation of the surprising activation effect observed, which is the object of the present application.

In order to show the unexpected and systematic character of the properties of the combinations of substances according to the invention, an operating process capable of reproducing in the laboratory, precisely and as rapidly as possible, the scaling phenomena encountered in steam and hot water generators and in air cooling or humidification circuits, has been adopted.

Indeed, most scaling phenomena are due to progressive insolubilization of precipitable salts in water under the combined or separate effects of an increase in temperature and/or increase in concentration by evaporation of water with scaling properties.

It is known that the tests usually suitable for studying and reproducing these phenomena are usually rather lengthy at low temperatures and are not easy to run, nor are they risk-free for the facilities in industrial steam or hot-water generators. It was with the aim of mitigating these drawbacks that the operating process used for the tests was derived from the "VdTUeV-Richtlinien fuer die Untersuchung von Kesselsteingegenmitteln" Ausgabe 1973 (TUV Guidelines for Testing Scale-Inhibiting Agents, September, 1973 edition).

The equipment for scale testing by evaporation and concentration at atmospheric pressure of a scaling water is composed principally of: (1) a heater comprising a submersible quartz tube with a power rating of 0.5 kW, a minimum total length of 350 mm, and a uniform diameter of 38 mm with a uniform heat production zone of about 40 mm beginning at a maximum of 10 mm from the lower end of the tube, (2) a two-liter high-form beaker placed in a second low-form beaker and held in the latter by one or more rings made of cork or an insulating material retaining as much as possible of the hot interstitial air between the two beakers; (3) a reserve tank (transparent or opaque) with a minimum useful capacity of 6 liters, fitted with a finely adjustable valve and having a transparent plastic hose terminating above the two-liter high-form beaker.

The quartz heater is mounted axially and vertically such that its lower end is situated 15 mm from the bottom of the two-liter high-form beaker.

The scaling water used for the test is prepared from demineralized water (0.1 microsiemens/cm) in which calcium carbonate (analytically pure $CaCO_3$) and calcium sulfate (analytically pure $CaSO_4$) are dissolved such that, after bubbling with carbon dioxide until the calcium salts are totally dissolved and bubbling with filtered air to remove as much as possible of the dissolved carbon dioxide, the water obtained contains 10° (French) sulfate hardness and 54° (French) carbonate hardness, i.e. 640 mg/kg total calcium expressed in $CaCO_3$ (or 358.4 mg/kg CaO). The quantity of water prepared in this way subjected to heat shock and progressive evaporation is very precisely adjusted to 6000 ml for each test such that the total quantity of $CaCO_3$ introduced into the inner beaker is $6 \times 640 = 3840$ mg.

The scaling inhibitor or mixtures of scaling inhibitors are previously added to 6 liters of test water in the form of 10% predispersions or solutions in demineralized water (0.1 microsiemens/cm) in quantities such that 6 liters of test water contain the amounts indicated in parts per million by weight of active dry material in Table I.

The test process consists of rapidly introducing 1200 ml of treated water into the two-liter high-form beaker and immediately turning on the quartz heater. When the boiling point is reached, the water level in the beaker is kept constant by means of the adjustable valve to offset evaporation until all of the 6000 ml of water to be tested has been added.

The boiling point is then maintained until the volume of water in the beaker has been reduced to 600 ml±50 ml, i.e. a concentration by a factor of about 10. The evaporation rate is generally between 0.630 and 0.670 l/h. The heater is then turned off and the entire apparatus left to stand and cool gradually to room temperature.

All the demineralized water used for the measurements hereinbelow has a conductivity of 0.1 microsiemens/cm.

Using a 0.5 mm mesh screen, then a pleated paper filter, the water from the beaker is filtered and the filtered volume measured exactly. The $CaCO_3$ content of this water is carefully measured by titrimetry with the aid of a Merck No. 11.110 Aquamerck calcium kit. This content, multiplied by the volume, gives the quantity of nonprecipitated calcium that has remained soluble in the concentrated water.

Then, without any mechanical action, the beaker is rinsed with about 100 ml of demineralized water, which is also filtered through the screen and paper filter. The sludge still adhering to the walls of the beaker and the sludge held back in the paper filter are dissolved in dilute hydrochloric acid and the solution obtained, after careful and repeated rinsing of the beaker and filter with demineralized water, is added to the 100 ml already filtered and the whole is placed in a calibrated flask and topped up to 1000 ml with demineralized water. The calcium, expressed in mg of $CaCO_3$ precipitated in the form of sludge, is then titrated as before.

All the scale deposited on the heater and that retained by the screen is carefully dissolved in dilute hydrochloric acid, and the solution is placed in a graduated flask. The heater and screen are rinsed with large amounts of demineralized water until the contents of the flask reach 1000 ml. The calcium is then titrated as before in the hydrochloric acid solution, expressed in milligrams of $CaCO_3$ precipitated in the form of scale.

The sum of milligrams of $CaCO_3$ measured in the concentrated water, the sludge, and the scale must reach $3840 \pm 2\%$.

The results of the various tests performed according to this procedure are set forth in Table I and are given only as nonlimitative examples.

ordinarily compatible only with difficulty, in an aqueous solution, with the polymer inhibitors cited in the tests, with which they generally yield poorly soluble compounds, the fact of injecting them separately into scaling industrial waters, or previously making them compatible by an appropriate means with said scaling polymers with a view to increasing the scale-inhibiting effectiveness of the latter polymers, would not depart from the scope of the invention.

The tests mentioned in Table I were deliberately limited to total inhibitor concentrations of 2, 20, and 30 ppm of active products in order to simplify the description of the invention and make the systematic progression of the results obtained easy to compare. But it is obvious that the fact of using quantities of fatty polyamines and polymer scaling inhibitors with sequestering and/or dispersing effects that are different from those mentioned as examples would not depart from the scope of the present invention.

TABLE I

Comparative Results of Scale Inhibiting Tests in Increasing Order of Effectiveness
Key: ppm = parts per million (by weight)
mmw = mean molecular weight

| Inhibiting Compositions (active substance) | | Qty. ppm dry | Quantities of calcium in mg $CaCO_3$ | | | | Percent error from theory | Percent precipitates in form of: | | reduction % |
|---|---|---|---|---|---|---|---|---|---|---|
| | | | Water | Sludge | Scale | Total | | Sludge | Scale | |
| Aliphatic | A | 2 | 1067 | 199 | 2572 | 3838 | −0,05 | 7,2 | 92,8 | |
| polyamines | B | 20 | 602 | 1369 | 1884 | 3855 | +0,4 | 42,1 | 57,9 | |
| w/ $C_{12}$-$C_{18}$ | | | | | | | | | | |
| POLYMALEATES | C | 20 | 614 | 1410 | 1805 | 3829 | −0,3 | 43,9 | 56,1 | |
| mmw 800 | D | 18 + A | 587 | 1650 | 1580 | 3817 | −0,6 | 51,1 | 48,9 | −12,8% |
| POLYACRYLATES | E | 20 | 578 | 1700 | 1535 | 3813 | −0,7 | 52,6 | 47,4 | |
| mmw 1000 | F | 18 + A | 585 | 1905 | 1330 | 3820 | −0,5 | 58,9 | 41,1 | −13,3% |
| POLYACRYLATES | G | 20 | 548 | 1970 | 1300 | 3818 | −0,6 | 60,4 | 39,6 | |
| mmw 800 | H | 18 + A | 565 | 2199 | 1065 | 3829 | −0,3 | 67,4 | 32,6 | −17,7% |
| POLYACRYLATES | J | 20 | 526 | 2200 | 1106 | 3832 | −0,2 | 66,5 | 33,5 | |
| mmw 1500 | K | 18 + A | 576 | 2356 | 916 | 3848 | +0,2 | 72,0 | 28,0 | −16,4% |
| Mixtures of | L | 20 | 570 | 2130 | 1130 | 3830 | −0,3 | 65,3 | 34,7 | |
| POLYACRYLATES | M | 18 + A | 602 | 2460 | 760 | 3822 | −0,5 | 76,4 | 23,6 | −32,0% |
| mmw 1500 & | N | 30 | 578 | 2275 | 975 | 3828 | −0,3 | 70,0 | 30,0 | |
| mmw 1000 | P | 28 + A | 540 | 2647 | 657 | 3844 | +0,1 | 80,1 | 19,9 | −33,7% |
| 2:1 | | | | | | | | | | |

The results set forth in Table I indeed show that, under the testing conditions, the addition of only 2 ppm aliphatic polyamines with $C_{12}$-$C_{18}$ to 18 or 28 ppm scale inhibitors with very different characteristics increases the respective activities of the latter by a much higher percentage than the inhibiting activity of polyamines alone at the low concentration at which they were added.

What is more, it also appears, surprisingly but indubitably, that the reinforcing activity of the polyamines concerned increases in direct proportion to the inhibiting effectiveness inherent in the polymers tested, either alone or in mixtures of polymers.

One need only compare the quantities of scale produced under the testing conditions A & B, C & D, E & F, G & H, J & K, L & M and N & P to see the remarkable and surprising nature of this "activation."

In tests A and B, the results of the tests conducted in the presence of polyamines alone at 2 and 20 ppm were deliberately listed to verify that, although under the test conditions they do have a certain inhibiting power at the level of 20 ppm, they do not, by contrast, produce such effects by themselves at the 2 ppm level at which they were added, in tests D, F, H, K, M, and P, to specific scale inhibitors.

Since said aliphatic polyamines with $C_{12}$-$C_{18}$ described in French Pat. No. 1,453,023 already cited are In an identical manner, the fact of using, the scale-inhibiting purposes, combinations of fatty polyamines and polymer scale inhibitors with sequestering and/or dispersing effects possessing molecular weights different from those indicated as nonlimitative examples, in Table I, would not depart from the scope of the present invention.

Also, the fact of introducing combinations of fatty polyamines with $C_{12}$-$C_{18}$ and scale-inhibiting polymers into industrial waters, subjected to evaporation or concentration, having far lower or even higher precipitable-cation levels than those used in the testing, would not depart from the scope of the invention. Likewise, the use of said combinations of polyamines and scale-inhibiting polymers in waters containing precipitable cations different from those used as examples in the tests would not be beyond the scope of the present invention.

Finally, the addition, to anti-scale and/or dispersing polymers, of polyamines of the type claimed in the French patent already cited, No. 1,435,023, in a scaling water, under the pretext of some anti-corrosion activity, would not be outside the scope of the present invention. Indeed, industrial waters with even a slight scaling property are generally not corrosive, as shown by the remarkable work of the French authors Poirier and Legrand written up in "Theorie des eaux naturelles"

[Theory of Natural Waters], with the exception of highly chlorinated waters, for which certain specific corrosion inhibitors can indeed be required when they are used.

I claim:

1. A scale-inhibiting process for industrial water including calcium carbonate which process comprises adding to said industrial water, as a scale-inhibiting agent an effective amount of a combination of at least 50 wt.% of salts of polymers of ethylene acids selected from the group consisting of polymaleates, polyacrylates, polymethacrylates, maleate-acrylate copolymers, acrylate-methacrylate copolymers, acrylate-methacrylate-itaconate terpolymers, and mixtures of these substances, plus about 5 to 50 wt.% of aliphatic polyamines having the formula

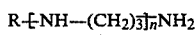

$$R\!-\!\!\left[\!NH\!-\!(CH_2)_3\!\right]_{\!\!n}\!NH_2$$

wherein R represents an aliphatic radical having 12 to 18 carbon atoms and n is a whole number between 1 and 6, with the percentages being based on polymers and polyamines in the dry state, and wherein (a) said polymaleates and maleate-acrylate copolymers are obtained by forming salts of acids having the general formula

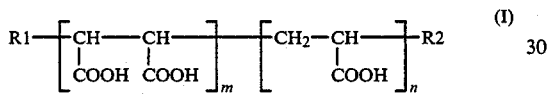

(I)

wherein R1 and R2, which are different or identical, are hydrogen or radicals derived from the polymerization solvent or catalyst used, m is positive, and the sum m+n is at least equal to 2 and less than approximately 50 and such that said polymaleates and maleate-acrylate copolymers have molecular weights between about 300 and about 5000;

(b) the polyacrylates are obtained by forming salts of acids having the general formula

(II)

wherein p has a value such that the mean molecular weight of said polyacrylate polymers is approximately 1500;

(c) the polymethacrylates and acrylate-methacrylate copolymers used are obtained by forming salts of acids having the general formula

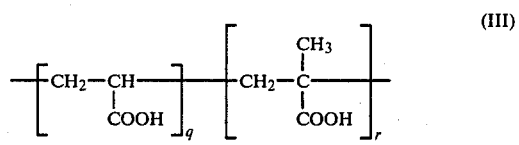

(III)

wherein, in the case of methacrylic acid polymers, q is equal to zero and r has a value such that the mean molecular weight of said methacrylic polymers is about 800 and, in the case of copolymers of acrylic and methacrylic acids, q and r have values such that the sum q+r confers on said copolymers of acrylic and methacrylic acids molecular weights between about 400 and 1200; and (d) the acrylate-methacrylate-itaconate terpolymers used are obtained by forming salts of acids having the general formula

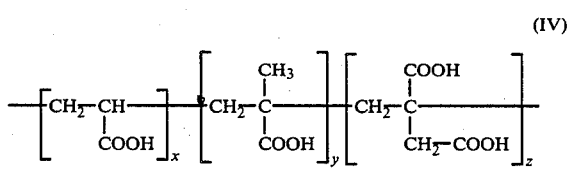

(IV)

wherein x, y, and z, expressed in wt.%, have at least a value of 10 for x and y and a value of 5 for z and are such that the sums x+y+z confer on said terpolymers molecular weights distributed between about 700 and about 1500, to inhibit precipitation of calcium carbonate-containing scale in said industrial water.

2. The process of claim 1 wherein said polymaleates and maleate-acrylate copolymers have a mean molecular weight of about 800.

3. The process of claim 1 wherein said acrylate-methacrylate copolymers have a mean molecular weight of about 800.

4. The process of claim 1 wherein at least 90% of said acrylate-methacrylate copolymers have molecular weights between about 400 and about 1000.

5. The method of claim 1 wherein said acrylate-methacrylate-itaconate terpolymers have a mean molecular weight of about 1000.

6. The process of claim 1, wherein said combination contains 95 to 85 wt.% of said polymers and 5 to 15 wt.% of said aliphatic polyamines.

7. The process of claim 1, wherein said polyamines are employed in the form of dispersions or solutions in water, and said salts of polymers are employed in the form of solutions in water.

* * * * *

UNITED STATES PATENT AND TRADEMARK OFFICE
CERTIFICATE OF CORRECTION

PATENT NO. : 4,704,208
DATED : November 3, 1987
INVENTOR(S) : Philippe A. Bouet

It is certified that error appears in the above-identified patent and that said Letters Patent is hereby corrected as shown below:

Column 1, line 57, "literature and" should read --literature are--

Column 3, line 26, "as combination" should read --a combination--

Column 5, line 12, "10 x" should read --10 for x--

Column 8, line 43, "using, the" should read --using, for--

Signed and Sealed this

Fifteenth Day of November, 1988

Attest:

DONALD J. QUIGG

*Attesting Officer*     *Commissioner of Patents and Trademarks*